United States Patent
Wood et al.

(10) Patent No.: US 10,091,330 B2
(45) Date of Patent: Oct. 2, 2018

(54) INTEREST SCHEDULING BY AN INFORMATION AND DATA FRAMEWORK IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 15/078,381

(22) Filed: Mar. 23, 2016

(65) Prior Publication Data
US 2017/0279920 A1     Sep. 28, 2017

(51) Int. Cl.
*H04L 29/08* (2006.01)
*H04L 12/26* (2006.01)
(Continued)

(52) U.S. Cl.
CPC .......... *H04L 67/32* (2013.01); *H04L 43/0864* (2013.01); *H04L 47/10* (2013.01); *H04L 47/27* (2013.01); *H04L 67/327* (2013.01)

(58) Field of Classification Search
CPC .......... H04L 67/32; H04L 47/27; H04L 43/08
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

(Continued)

*Primary Examiner* — Xaveir Szewai Wong

(57) ABSTRACT

One embodiment provides a system for facilitating scheduling of interests in a CCN. The system determines, by a scheduler component, network properties associated with name prefixes of interests transmitted by a plurality of local applications, wherein a name for an interest is a hierarchically structured variable length identifier that includes contiguous name components ordered from a most general level to a most specific level, and wherein a name prefix includes one or more contiguous name components. The system generates a first interest which indicates a command to set a window size for a transport stack associated with a respective local application based on the network properties. The system transmits the first interest to a component associated with the transport stack, which causes the component to set the window size for the transport stack, thereby facilitating scheduling of interests based on the network properties.

20 Claims, 6 Drawing Sheets

(51) Int. Cl.
*H04L 12/807* (2013.01)
*H04L 12/801* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,649,109 A | 7/1997 | Griesmer |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,182,133 B1 | 1/2001 | Horvitz |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,947 B1 | 4/2002 | Kavner |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,426,696 B1 | 9/2008 | Hwang |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,627,122 B1* | 12/2009 | Horn ............... H04W 12/06 370/331 |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,711,684 B2 | 5/2010 | Sundaresan |
| 7,747,749 B1 | 6/2010 | Aamodt |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,814,425 B1 | 10/2010 | O'Shaugnessy |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,688,727 B1 | 4/2014 | Das |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |

(56) References Cited

U.S. PATENT DOCUMENTS

| | | |
|---|---|---|
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 | 10/2014 | Zhang |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,009,465 B2 | 4/2015 | Zhang |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,380,326 B1 | 6/2016 | Corley |
| 9,400,852 B2 | 7/2016 | Kim |
| 2001/0051927 A1 | 12/2001 | London |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0075813 A1* | 6/2002 | Baldonado .............. H04L 43/00 370/254 |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0049541 A1 | 3/2004 | Swahn |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0248078 A1 | 11/2006 | Gross |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1 | 4/2008 | Bessieres |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123536 A1 | 5/2008 | Johnson |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |

(56) References Cited

U.S. PATENT DOCUMENTS

| | | |
|---|---|---|
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1 | 10/2008 | Louch |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |

(56) References Cited

U.S. PATENT DOCUMENTS

| | | |
|---|---|---|
| 2012/0137367 A1 | 5/2012 | Dupont |
| 2012/0141093 A1 | 6/2012 | Yamaguchi |
| 2012/0155464 A1 | 6/2012 | Kim |
| 2012/0158912 A1 | 6/2012 | Jacobson |
| 2012/0158973 A1 | 6/2012 | Jacobson |
| 2012/0163373 A1 | 6/2012 | Lo |
| 2012/0166433 A1 | 6/2012 | Tseng |
| 2012/0166806 A1 | 6/2012 | Zhang |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0237028 A1 | 9/2012 | Khazan |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0016695 A1 | 1/2013 | Ravindran |
| 2013/0024560 A1 | 1/2013 | Vasseur |
| 2013/0039249 A1 | 2/2013 | Ravindran |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1* | 3/2013 | Wang ............... H04L 67/327 709/238 |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110781 A1 | 5/2013 | Golab |
| 2013/0110987 A1 | 5/2013 | Kim |
| 2013/0111063 A1 | 5/2013 | Lee |
| 2013/0121489 A1 | 5/2013 | Pestoni |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0163758 A1 | 6/2013 | Viswanathan |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0258878 A1 | 10/2013 | Wakikawa |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332955 A1 | 12/2013 | Hong |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1* | 12/2013 | Hong ............... H04L 67/16 709/217 |
| 2013/0343408 A1 | 12/2013 | Cook |
| 2013/0346877 A1 | 12/2013 | Borovoy |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1 | 1/2014 | Calo |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0090761 A1 | 4/2014 | Foucher |
| 2014/0096249 A1 | 4/2014 | Dupont |
| 2014/0096269 A1 | 4/2014 | Amidei |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129690 A1 | 5/2014 | Jaisinghani |
| 2014/0129736 A1* | 5/2014 | Yu ............... H04L 45/08 709/242 |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1* | 6/2014 | Kim ............... H04L 67/06 707/769 |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |

(56) References Cited

U.S. PATENT DOCUMENTS

| | | |
|---|---|---|
| 2014/0314093 A1 | 10/2014 | You |
| 2014/0337276 A1 | 11/2014 | Iordanov |
| 2014/0365550 A1* | 12/2014 | Jang .................... H04L 67/2842 709/201 |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1 | 2/2015 | Mosko |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0117253 A1 | 4/2015 | Scott |
| 2015/0120663 A1 | 4/2015 | LeScouarnec |
| 2015/0169758 A1 | 6/2015 | Assom |
| 2015/0172307 A1* | 6/2015 | Borohovski .......... G06F 21/577 726/25 |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0222424 A1 | 8/2015 | Mosko |
| 2015/0270957 A1 | 9/2015 | Uzun |
| 2015/0279348 A1 | 10/2015 | Cao |
| 2015/0281071 A1 | 10/2015 | Mosko |
| 2015/0288679 A1* | 10/2015 | Ben-Nun .............. H04L 67/141 726/10 |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0014027 A1 | 1/2016 | Oran |
| 2016/0019275 A1 | 1/2016 | Mosko |
| 2016/0021172 A1 | 1/2016 | Mahadevan |
| 2016/0062840 A1 | 3/2016 | Scott |
| 2016/0065677 A1 | 3/2016 | Mosko |
| 2016/0110466 A1 | 4/2016 | Uzun |
| 2016/0149913 A1 | 5/2016 | Eriksson |
| 2016/0171184 A1 | 6/2016 | Solis |
| 2016/0173604 A1 | 6/2016 | Panigrahi |
| 2016/0366620 A1* | 12/2016 | Royon .................... H04L 67/10 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2562978 | 10/2014 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2011159715 | 12/2011 |
| WO | 2012077073 A1 | 6/2012 |
| WO | 2013123410 | 8/2013 |
| WO | 2014023072 | 2/2014 |
| WO | 2014090761 | 6/2014 |
| WO | 2014102371 | 7/2014 |
| WO | 2015084327 | 6/2015 |

OTHER PUBLICATIONS

"PBC Library-Pairing-Based Cryptography-About," http://crypto.stanford.edu/pbc. downloaded Apr. 27, 2015.

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Anteniese et al., "Improved Proxy Re-Encryption Schemes with Applications to Secure Distributed Storage", 2006.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management Using Broadcast Encryption. May 2004, IEEE vol. 92 Issue 6.

J. Shao and Z. Cao. CCA-Secure Proxy Re-Encryption without Pairings. Public Key Cryptography. Springer Lecture Notes in Computer Science vol. 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

(56) References Cited

OTHER PUBLICATIONS

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: A fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

(56) References Cited

OTHER PUBLICATIONS

Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: a multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.

(56) References Cited

OTHER PUBLICATIONS

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al.,"DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2011, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

C. Gentry and A. Silverberg. Hierarchical ID-Based Cryptography. Advances in Cryptology—ASIACRYPT 2002. Springer Berlin Heidelberg (2002).

Zahariadis, Theodore, et al. "Trust management in wireless sensor networks." European Transactions on Telecommunications 21.4 (2010): 386-395.

Koponen, Teemu et al., "A Data-Oriented (and Beyond) Network Architecture", SIGCOMM '07, Aug. 27-31, 2007, Kyoto, Japan, XP-002579021, p. 181-192.

Mahadevan, Priya, et al. "Systematic topology analysis and generation using degree correlations." ACM SIGCOMM Computer Communication Review. vol. 36. No. 4. ACM, 2006.

Xiong et al., "CloudSeal: End-to-End Content Protection in Cloud-based Storage and Delivery Services", 2012.

https://code.google.com/p/ccnx-trace/.

Biradar et al., "Review of multicast routing mechanisms in mobile ad hoc networks", Aug. 16, Journal of Network and Computer Applications 35 (2012) 221-229.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Xie et al. "Collaborative Forwarding and Caching in Content Centric Networks", Networking 2012.

Amadeo et al. "Design and Analysis of a Transport-Level Solution for Content-Centric VANETs", University "Mediterranea" of Reggio Calabria, Jun. 15, 2013.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.

Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

(56) References Cited

OTHER PUBLICATIONS

Microsoft Computer Dictionary, Fifth Edition, 2002, Microsoft Press, p. 23.
Mind—A Brief Introduction, John R. Searle, 2004, Oxford University Press, pp. 62-67.
J.J. Garcia-Luna-Aceves "Name-Based Content Routing in Information Centric Networks Using Distance Information", Proceedings of the 1st International Conference on Information-Centric Networking, INC '14, Sep. 24, 2014, pp. 7-16, *p. 10, left-hand column, first paragraph*.
Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], *section 3.1; p. 4*.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003] - [006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
International Search Report and Written Opinion in corresponding International Application No. PCT/US2017/023065, dated May 29, 2017, 13 pages.
Carofiglio, et al., "Optimal Multipath Congestion Control and Request Forwarding in Information-Centric Networks", 2013 21st IEEE International Conference on Network Protocols (ICNP), IEEE, XP032563712, DOI: 10,1109/ICNP.2013.6733576, Oct. 7-10, 2013, 10 pgs.

* cited by examiner

INTEREST SCHEDULING BY AN INFORMATION AND DATA FRAMEWORK IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/746,490, entitled "TRANSPORT STACK NAME SCHEME AND IDENTITY MANAGEMENT," by inventors Christopher A. Wood and Glenn C. Scott, filed 22 Jun. 2015 (hereinafter "U.S. patent application Ser. No. 14/746,490"); and U.S. patent application Ser. No. 15/052,739, entitled "INFORMATION AND DATA FRAMEWORK IN A CONTENT CENTRIC NETWORK," by inventors Christopher A. Wood and Glenn C. Scott, filed 24 Feb. 2016 (hereinafter "U.S. patent application Ser. No. 15/052,739");

the disclosures of which are herein incorporated by reference in their entirety.

BACKGROUND

Field

This disclosure is generally related to distribution of digital content. More specifically, this disclosure is related to a system which facilitates scheduling of interests sent from multiple applications via a single forwarder in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. A CCN name prefix, or namespace, may include one or more contiguous name components beginning from the most general level.

Multiple local applications on the same machine may issue interest packets and receive corresponding content object packets. These packets must all pass through the same single local forwarder on the machine. An increased rate of interest issuance by the applications may create a bottleneck at the forwarder, which can result in congestion and decreased network efficiency.

While a CCN brings many desired features to a network, some issues remain unsolved with preventing network congestion at a single forwarder when multiple applications issue interests on the same machine.

SUMMARY

One embodiment provides a system for facilitating scheduling of interests in a CCN. The system determines network properties associated with name prefixes of interests transmitted by a plurality of local applications, wherein a name for an interest is a hierarchically structured variable length identifier that includes contiguous name components ordered from a most general level to a most specific level, and wherein a name prefix includes one or more contiguous name components. The system generates a first interest which indicates a command to set a window size for a transport stack associated with a respective local application based on the network properties. The system transmits the first interest to a component associated with the transport stack, which causes the component to set the window size for the transport stack, thereby facilitating scheduling of interests based on the network properties.

In some embodiments, the network properties are further associated with content objects received by the local applications in response to the transmitted interests, and the network properties are one or more of: a round trip time that begins when an interest is transmitted and ends when a corresponding content object is received; an estimate of a round trip time based on round trip times for transmitted interests and corresponding received content objects based on a predetermined amount of time; a total number of the transmitted interests; a number of the transmitted interests based on the predetermined amount of time; a changing rate of the transmitted interests and the corresponding received content objects based on the predetermined amount of time; a total number of interest return messages received, wherein an interest return message is received in response to an interest and is identified based on a code indicated in the message; a number of the interest return messages received based on the predetermined amount of time; a number of the transmitted interests for which a corresponding content object is not received based on the predetermined amount of time; a number of the transmitted interests that time out based on the predetermined amount of time; a number of the transmitted interests which are retransmitted based on the predetermined amount of time; and a number of retransmitted interests that time out based on the predetermined amount of time.

In some embodiments, the component associated with the transport stack is a flow controller component that sets the window size for transmission of packets through the transport stack, and the flow controller component resides: in the transport stack as a component of the transport stack; or between the applications and the transport stack.

In some embodiments, the method is performed by a scheduler component that resides between the local applications and a portal instance associated with the transport stack. The scheduler component, the local applications, the component associated with the transport stack, and the transport stack reside on a same computing device.

In some embodiments, the system determines a priority or a weight for the transport stack associated with the respective local application based on one or more of: the network properties; a characteristic of interests transmitted by the respective local application; and information indicated in the interests transmitted by the respective local application.

In some embodiments, a characteristic of an interest includes whether one or more fields of the interest are encrypted or whether one or more name components of the interest name are encrypted, and the information indicated in an interest includes a request to categorize the interest at a specific priority.

In some embodiments, the system assigns the priority or the weight to the transport stack associated with the respective local application. The system indicates in the first interest a value for the window size, wherein the value is based on the priority or the weight.

In some embodiments, the system allocates a predetermined number of tokens to the transport stack based on a name prefix and the priority or the weight assigned to the transport stack. A second interest with a name that includes the name prefix is subsequently received from the respective local application by a flow controller component and causes the flow controller component to, in response to determining a sufficient number of allocated tokens, transmit the second interest to a local forwarder component associated with the transport stack.

In some embodiments, a name for the first interest indicates one or more of the following: a device on which the local applications reside; the transport stack associated with the respective local application; the component associated with the transport stack, wherein the component sets the window size in response to receiving the first interest; and the command to set the window size for the transport stack to a value.

Another embodiment provides a system for facilitating scheduling of interests in a CCN. The system receives a first interest which indicates a command to set a window size for a transport stack based on a name prefix, wherein a name for an interest is a hierarchically structured variable length identifier that includes contiguous name components ordered from a most general level to a most specific level, and wherein a name prefix includes one or more contiguous name components. The system receives a second interest with a name that includes the name prefix indicated in the first interest. In response to determining that the window size for the transport stack is sufficient, the system transmits the second interest to a forwarder component associated with the transport stack. In response to determining that the window size is not sufficient, the system refrains from transmitting the second interest, thereby facilitating scheduling of interests.

In some embodiments, the system receives an initial interest which indicates an allocation of a number of tokens for the name prefix, wherein a respective token is used to forward the second interest with the name that includes the name prefix. In response to determining a sufficient number of tokens for the name prefix, the system transmits the second interest to the forwarder component, and decreases the number of tokens for the name prefix. In response to determining an insufficient number of tokens for the name prefix, the system refrains from transmitting the second interest.

In some embodiments, the method is performed by a flow controller component that is associated with the transport stack and a local application. The flow controller component, the transport stack, and the local application reside on a same computing device.

BRIEF DESCRIPTION OF THE FIGURES

In the figures, like reference numerals refer to the same figure elements.

DETAILED DESCRIPTION

Figure 1:
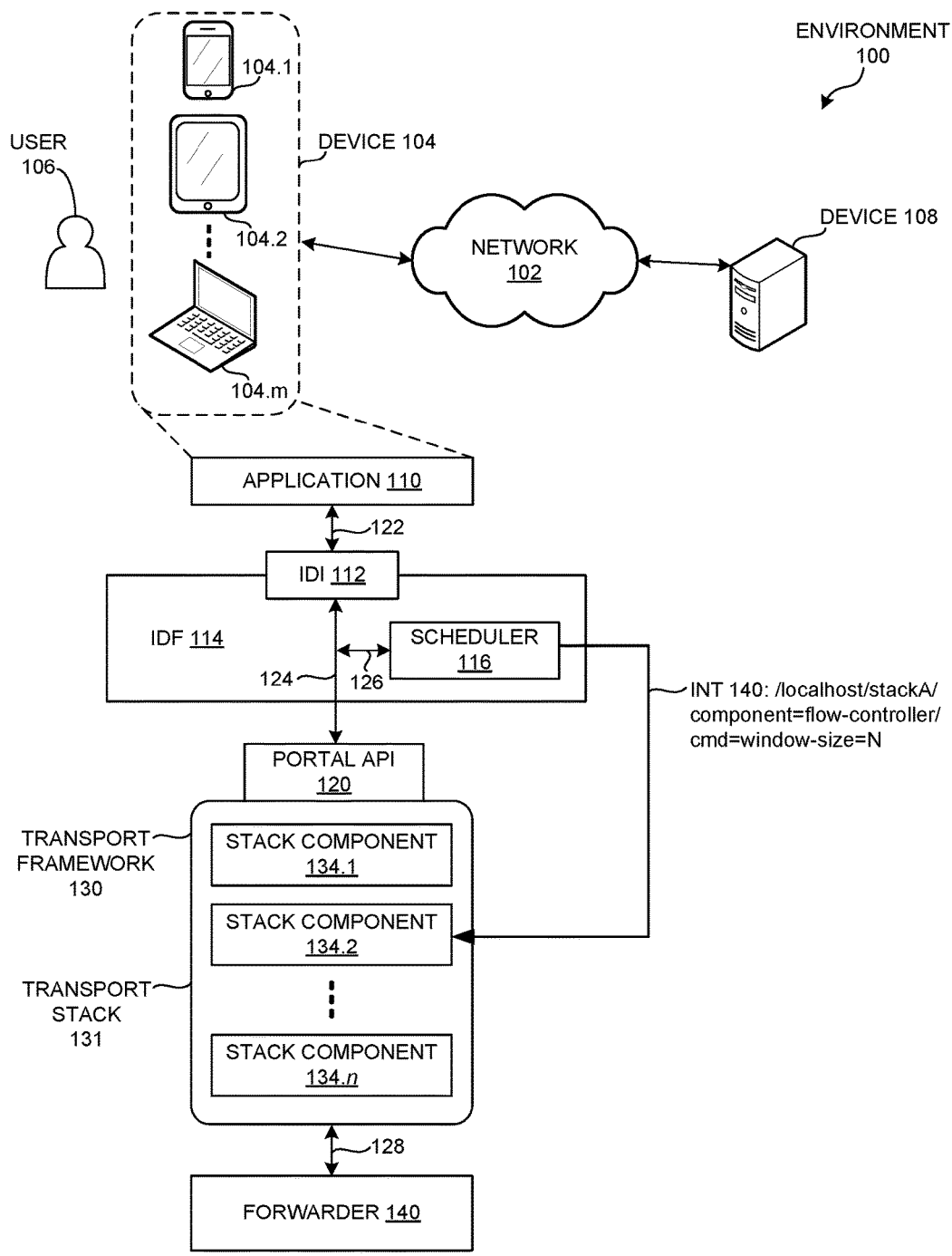
FIG. 1 illustrates an exemplary environment which facilitates scheduling of interests in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of enforcing fairness across multiple applications on the same machine by providing a system that controls interest throughput (e.g., window sizes for appropriate transport stacks). Multiple local applications on the same machine may issue interest packets and receive corresponding content object packets. These packets must all pass through the same single local forwarder on the machine. Thus, congestion may occur at the forwarder as a result of the interest issuance by the multiple applications. Embodiments of the present system solve this problem by providing a scheduler component within an information and data framework ("IDF"). The IDF can be implemented as a component that resides between a local application and a transport stack, as described in detail in U.S. patent application Ser. No. 15/052,739. A local application transmits and receives all network traffic (i.e., interests and content objects) via the IDF, specifically, via the IDF interface ("IDI"). The IDF can communicate with a transport stack by instantiating a CCN Portal API. The IDF operates in the context of an entire system, such as a single computing device or end-host. Thus, multiple local applications on the same machine may use the same IDF, which communicates with multiple transport stacks via multiple Portal API instances.

The scheduler component of the IDF can observe and determine network properties (such as frequency of interest issuance, RTT estimates, burstiness, a total count, interest returns, etc.), and inform flow-related components of window size limitations. The scheduler component can thus impose a "fair" scheduling of interests by sending commands to, e.g., a flow controller component, to set a window size for interests with a specific name prefix to a certain value. Components of or associated with a CCN transport stack are individually addressable, as described in U.S. patent application Ser. No. 14/746,490.

The scheduler component can apply a standard network scheduling algorithm based on the network properties to determine the optimal value for the window sizes. An example of a scheduling algorithm is a hierarchical token bucket, where the system assigns or allocates a predetermined number of tokens for a particular name prefix. Another example is based on generalized processor sharing, where the system throttles interest issuance for interests that require expensive computations (e.g., decryption). Another scheduling algorithm is based on the stochastic fair blue algorithm, where the system uses congestion control notifications to limit the window size for a particular name prefix.

For example, the scheduler component can observe and determine the rates of issuance for interests under a same name prefix from two separate local applications, "App A" and "App B." A high rate of interest issuance for both applications may result in increased congestion, which may cause the individual transport protocol implementations to throttle interest issuance based on an implementation-specific behavior. However, if the scheduler component detects high rates of issuance before the congestion begins, the scheduler component can send a message to the flow controller components associated with the respective transport stacks (e.g., "stackA" and "stackB") for App A and App B. For example, the message can include a command for flow controller A to set the size of its transmission window to a value of N, and the message can be an interest with a name of "/localhost/stackA/component=flow-controller/cmd=window-size=N." This message may decrease the adverse effects of congestion and any subsequent congestion control mechanism.

Additionally, the scheduler component can receive requests or preferences from a local application for a specific priority. In the example above, App A may inform the scheduler component that it is an elastic application (e.g., an email application) that does not require prompt processing or high bandwidth, while App B may inform the scheduler component that it is a file-sharing or video-streaming application that does require prompt processing and high bandwidth. App A and App B may inform the scheduler component of this preference or priority information in an interest message. The scheduler component can thus factor in such information when determining the optimal window size.

Thus, the scheduler component of the IDF can observe network properties associated with interests transmitted and content objects received by local applications, and use the network properties to enable interest scheduling by sending commands to set window sizes of various transport stacks to certain values. The scheduler component can also factor in preferences or priorities received from the local applications. Note that the IDF scheduler component does not schedule the actual interests; rather, the scheduler component communicates limitations, such as transmission window sizes for specific name prefixes, to separate protocol instances, which then impose the desired scheduling results.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In addition, "LCI" or "lci" refers to labeled content information and is a Universal Resource Indicator (URI) compliant identifier in which name segments carry a label. Network protocols such as CCN can use labeled content information by applying specific labels to each name segment of a URI. In a hierarchically structured name, a labeled content name assigns a semantic type or label to each segment. For example, a type of name segment can include a name segment which is a generic name segment that includes arbitrary octets, which allows a CCN to use a binary on-the-wire representation for messages.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates scheduling of interests in a content centric network, in accordance with an embodiment of the present invention. Computing environment 100 can include a computer network 102, such as a CCN. Environment 100 can also include a user 106 associated with a local computing device 104 and a remote computing device 108. Devices 104 and 108 can have internal transport stacks that exchange network packets with each other over network 102 (e.g., a transport stack 131 of a transport framework 130 of device 104). Device 104 can include any computing device coupled to network 102, such as a smartphone 104.1, a tablet computer 104.2, and/or a server or personal computer 104.m. Specifically, device 104 can include an application 110, an information and data framework interface ("IDI") 112 for an information and data framework ("IDF") 114, a portal API 120, transport framework 130, and a forwarder 140. IDF 114 can include a scheduler component 116 for sending commands related to a transmission window size.

Transport framework 130 can include a transport stack 131 with stack components 134.1-134.n. Transport framework 130 can include multiple transport stacks which each include multiple stack components or communication modules. In FIG. 1, transport framework 130 depicts a single transport stack (e.g., transport stack 131). Additionally, a single transport stack (e.g., transport stack 131) is associated with a single portal API instance (e.g., portal API 120). Forwarder 140 (e.g., a network interface card, or a router in a local area network) of device 104 can transfer packets between a stack (and individual stack components) of transport framework 130 and network 102. Forwarder 140 can also receive content objects in response to interests, and pass content objects back to application 110 via portal API 120 and IDF 114.

Device 104 can send interests through network 102, which interests pass through IDI 112 via a flow 122 to IDF 114, and subsequently travel through portal API 120 to transport stack 131 via a flow 124. The interests can have a name that is an HSVLI that includes name components ordered from a most general level to a most specific level, and a name can include a name prefix or namespace that includes one or more contiguous name components. The interests can also be observed by scheduler 116 via a flow 126. The interests travel through forwarder 140 to network 102 via a flow 128.

Thus, IDF 114 (and scheduler 116) can observe traffic received from and transmitted to application 110, and can also determine network properties based on a name prefix for the interests transmitted from application 110. The network properties can include, e.g., a rate of issuance, an estimate of a round trip time, and an approximated congestion probability based on interest return messages. Network properties that can be determined by the scheduler are described in detail below.

Based on a standard networking algorithm, scheduler 116 can determine to set a window size for transport stack 131 to a value of N. Scheduler 116 can generate and transmit an interest 140 directly to a stack component responsible for setting the transmission window size (e.g., stack component 134.2). Interest 140 can include a name of "/localhost/stackA/component=flow-controller/cmd=window-size=N." Thus, based on observed and determined network properties and a standard scheduling algorithm, scheduler 116 can impose limitations on flow controller components associated with a transport stack to achieve an optimal or desired scheduling of interests for the single forwarder.

Device 108 can include any computing device coupled to network 102, such as a server, an end host device, a content producing device, or a storage server. Device 108 can also include a local application, IDF, transport stack, and forwarder as described for device 104.

Figure 2:
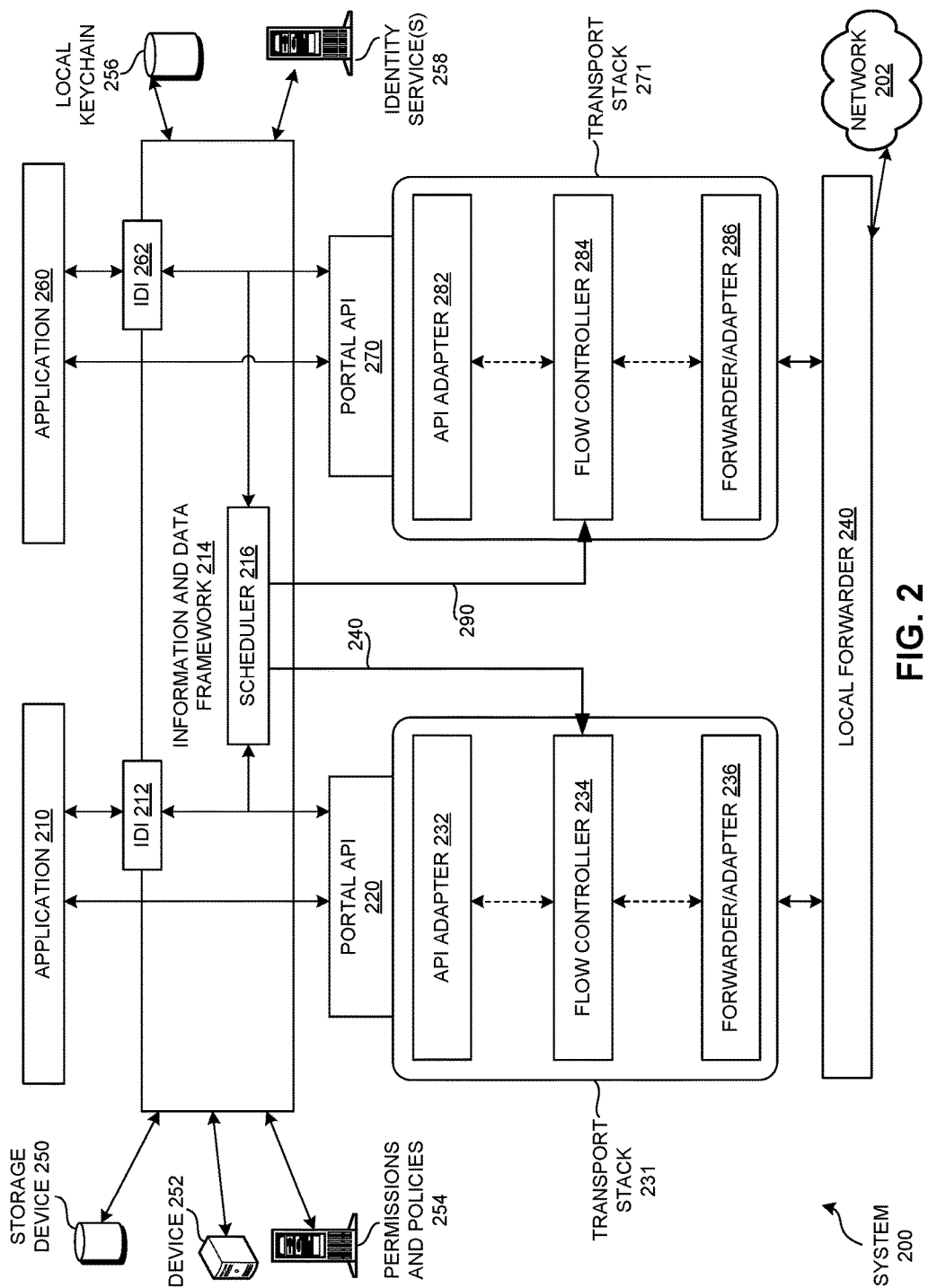
FIG. 2 illustrates an exemplary information and data framework in a system which facilitates scheduling of interests in a content centric network, in accordance with an embodiment of the present invention.

FIG. 2 illustrates an exemplary information and data framework in a system 200 which facilitates scheduling of interests in a content centric network, in accordance with an embodiment of the present invention. System 200 can reside on a single computing device, including a client computing device, a server, an end hosting, and a content producing device. System 200 can include an application 210 which communicates with an IDF 214 via an IDI 212. IDF 214 can include a scheduler component 216. Application 210 is associated with a portal API 220 for a transport stack 231 that includes stack components 232, 234, and 236. An API adapter 232 can communicate between an API and a specific transport stack of transport framework 230. A flow controller 234 can shape and manage traffic, pipeline and transmit interests, and order content objects. A forwarder/adapter 236 can communicate with a forwarder 240. Forwarder 240 can communicate with other forwarders over a network 202. Other stack components (not shown) can include functionality related to verification (e.g., encoding/decoding and signing/verifying content objects), security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

System 200 can also include an application 260 which communicates with IDF 214 via an IDI 262. Application 260 is associated with a portal API 270 for a transport stack 271 that includes an API adapter 282, a flow controller 284, and a forwarder/adapter 286.

In addition, IDF 214 can interface with a local operating system to access physically attached devices or resources, such as a storage device 250, a computing device 252, a permissions and policies server 254, and a local keychain data store 256. IDF 214 can coordinate with these resources to determine whether upper-level clients can perform, e.g., read and write commands. IDF 214 can also communicate with external services, such as an identity service(s) 258, to obtain authentication information and other related data. These external services may also provide cryptographic secrets needed to access content protected under a form of access control (e.g., encrypted data).

During operation (as described in relation to scheduler 116 of FIG. 1), scheduler 216 can observe traffic received from and transmitted to applications 210 and 260, and can also determine network properties based on a name prefix for the interests transmitted from applications 210 and 260. Based on the network properties, scheduler 216 can use a standard networking algorithm to determine optimal window sizes for transport stacks 231 and 271 associated with applications 210 and 260, respectively. Scheduler 216 can send an interest 240 to flow controller 234 of transport stack 231, where interest 240 includes a command for flow controller 234 to set a transmission window size to a specific value. Similarly, scheduler 216 can send an interest 290 to flow controller 284 of transport stack 271 to set its transmission window size to a specific value. In this way, scheduler 216 can achieve an optimal scheduling of interests by sending these "command" interest messages to a flow controller component or another component that is responsible for controlling the flow or setting the window size. Note that although flow controllers 234 and 284 are depicted as stack components within their respective transport stacks 231 and 271, flow controllers 234 and 284 can also reside outside of the transport stack. For example, flow controller 234 can reside between IDF 214 and portal API 220, or between application 210 and transport stack 231.

Network Properties Associated With Name Prefixes

The scheduler component can observe network properties associated with name prefixes for interests transmitted by a local application. Because a CCN interest is a request for a corresponding content object, the network properties are also associated with content objects received by the local applications in response to the transmitted interests. The network properties can include one or more of the following:

1) a round trip time that begins when an interest is transmitted and ends when a corresponding content object is received;
2) an estimate of a round trip time based on round trip times for transmitted interests and corresponding received content objects based on a predetermined amount of time;
3) a total number of the transmitted interests; a number of the transmitted interests based on the predetermined amount of time;
4) a changing rate of the transmitted interests and the corresponding received content objects based on the predetermined amount of time;
5) a total number of interest return messages received, wherein an interest return message is received in response to an interest and is identified based on a code indicated in the message;
6) a number of the interest return messages received based on the predetermined amount of time;
7) a number of the transmitted interests for which a corresponding content object is not received based on the predetermined amount of time;
8) a number of the transmitted interests that time out based on the predetermined amount of time;
9) a number of the transmitted interests which are retransmitted based on the predetermined amount of time; and
10) a number of retransmitted interests that time out based on the predetermined amount of time.

Role of Scheduler Component of IDF

Figure 3:
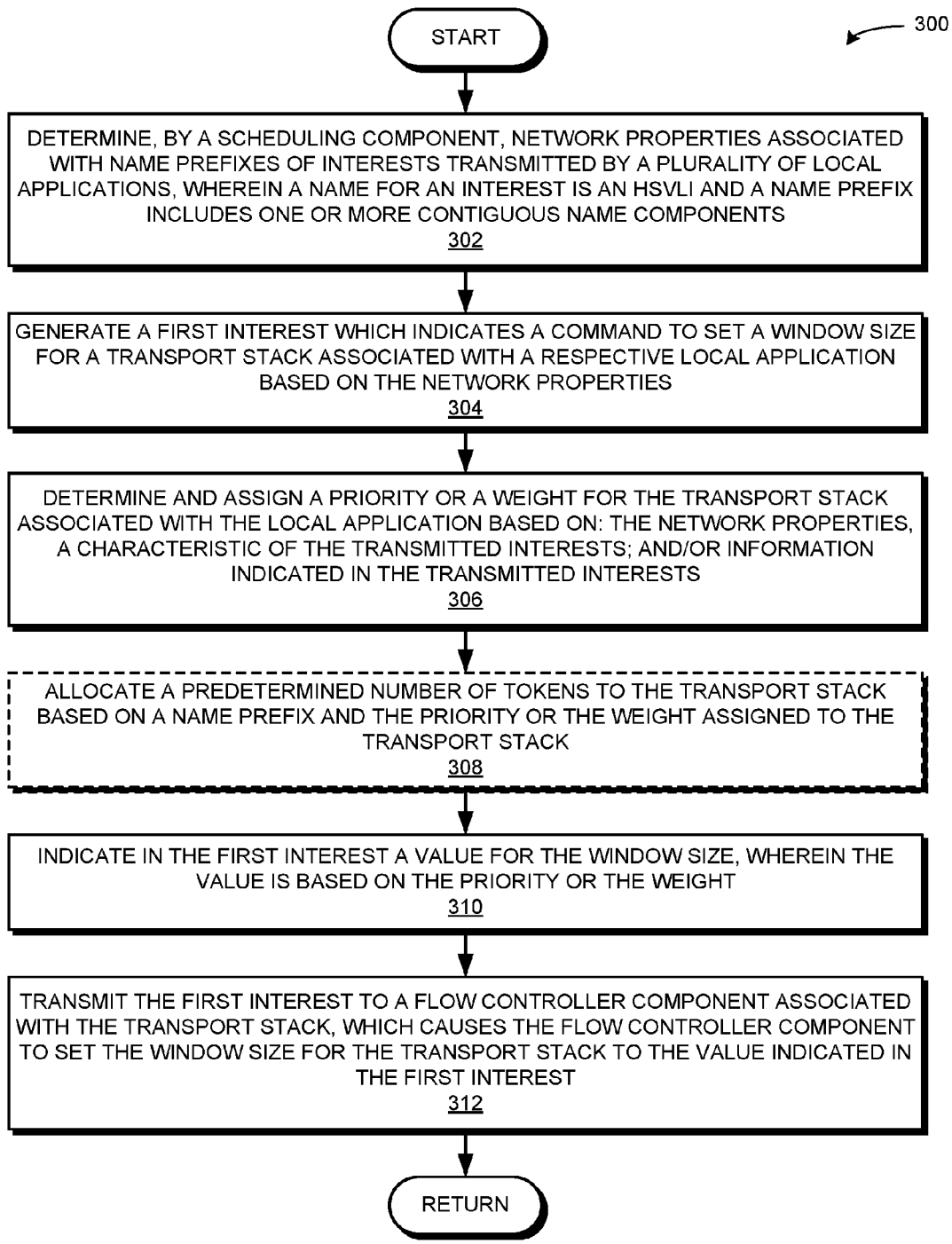
FIG. 3 presents a flow chart illustrating a method by a scheduler component for facilitating scheduling of interests in a content centric network, in accordance with an embodiment of the present invention.

FIG. 3 presents a flow chart 300 illustrating a method by a scheduler component for facilitating scheduling of interests in a content centric network, in accordance with an embodiment of the present invention. During operation, the system determines, by a scheduler component, network properties associated with name prefixes of interests transmitted by a plurality of local applications (operation 302). A name for an interest is a hierarchically structured variable length identifier that includes contiguous name components ordered from a most general level to a most specific level, and a name prefix includes one or more contiguous name components. The system generates a first interest which indicates a command to set a window size for a transport stack associated with a respective local application based on the network properties (operation 304). The system determines and assigns a priority or a weight for the transport stack associated with the local application based on based on: the network properties; a characteristic of the transmitted interests; and/or information indicated in the transmitted interests (operation 306).

The system can determine and assign the priority or weight based on a standard network scheduling algorithm. For example, the system can use a hierarchical token bucket and allocate a predetermined number of tokens to the transport stack based on a name prefix and the priority or weight assigned to the transport stack (e.g., operation 308). An interest name may include multiple name prefixes, and each prefix may be assigned a different number of tokens based on the hierarchical level of the name prefix. The system can determine the priority or weight based on the size of the token bucket and the rate at which tokens are added to the bucket.

The system can also use a generalized processor sharing method, and throttle interest issuance based on computation complexity associated with an interest (e.g., decrypting a field of the interest or a name component of the interest name). For example, the system may choose to process an encrypted interest earlier due to higher latency at an earlier stage, or the system may choose to process an encrypted interest later due to other factors. The system can further use a stochastic fair blue algorithm, and rely on congestion control notifications to limit the window size for a given name prefix. A congestion control notification may take the form of an interest return message, which indicates an error condition at an upstream node. The system may also detect when a certain number of interests transmitted to a given name prefix time out, in which case the system can reassign priorities or weight (e.g., window size) to other name prefixes.

The system indicates in the first interest a value for the window size, where the value is based on the priority or the weight (operation 310). Subsequently, the system transmits the first interest to a flow controller component associated with the transport stack, which causes the flow controller component to set the window size for the transport stack to the value indicated in the first interest (operation 312).

Role of Flow Controller Component

Figure 4A:
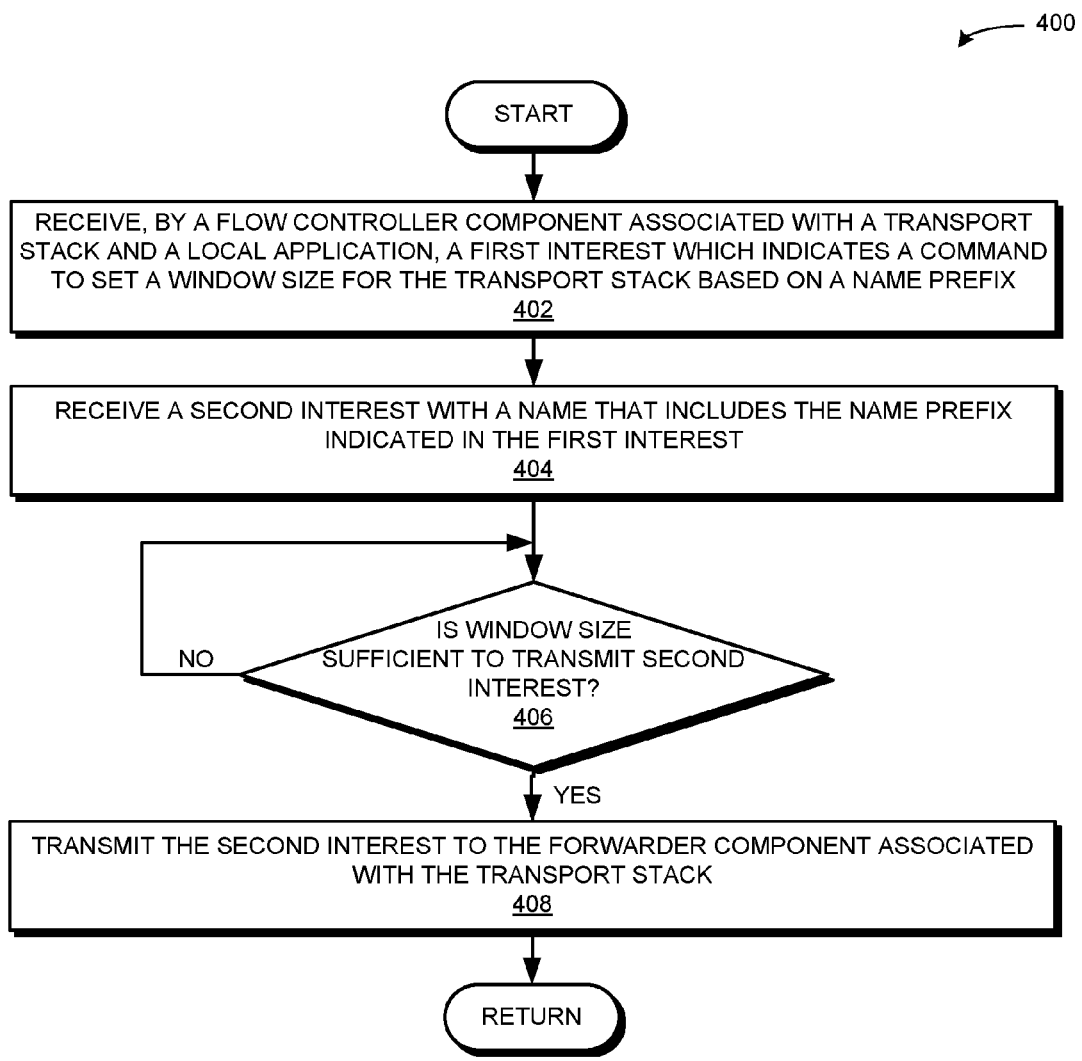
FIG. 4A presents a flow chart illustrating a method by a flow controller component for facilitating scheduling of interests in a content centric network, based on a window size, in accordance with an embodiment of the present invention.

FIG. 4A presents a flow chart 400 illustrating a method by a flow controller component for facilitating scheduling of interests in a content centric network, based on a window size, in accordance with an embodiment of the present invention. During operation, the system receives, by a flow controller component associated with a transport stack and a local application, a first interest which indicates a command to set a window size for the transport stack based on a name prefix (operation 402). The system receives a second interest with a name that includes the name prefix indicated in the first interest (operation 404). The system determines whether the window size for the transport stack is sufficient to transmit the second interest (decision 406). If the window size is sufficient, the system transmits the second interest to a forwarder component associated with the transport stack (operation 408). If the window size is not sufficient, the system refrains from transmitting the second interest to the forwarder component. The system can wait or block transmission of the second interest until the window size becomes sufficient. The system may also drop the second interest after a predetermined amount of time or a timeout of the second interest (not shown).

Figure 4B:
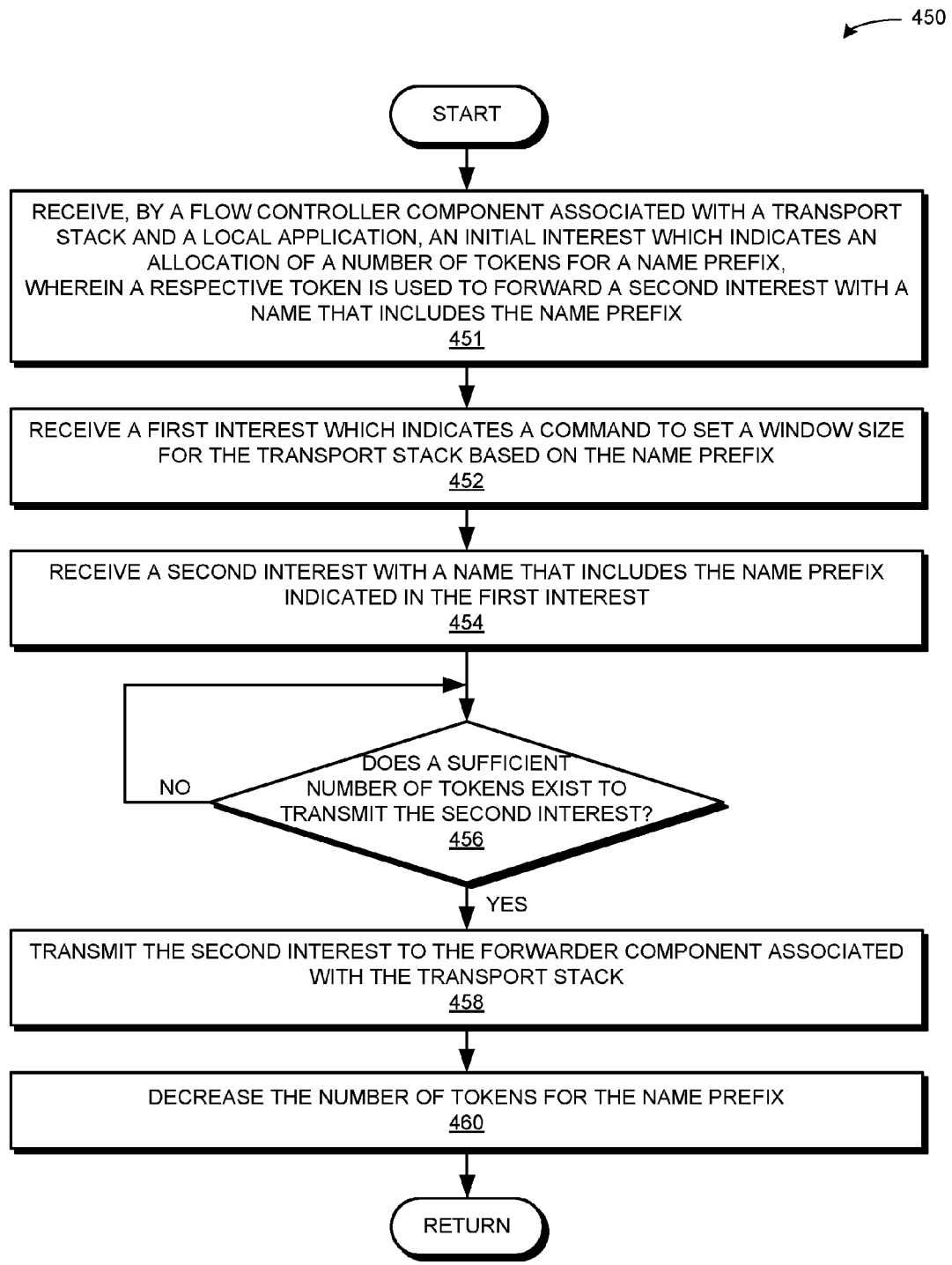
FIG. 4B presents a flow chart illustrating a method by a flow controller component for facilitating scheduling of interests in a content centric network, based on a token bucket size, in accordance with an embodiment of the present invention.

FIG. 4B presents a flow chart 450 illustrating a method by a flow controller component for facilitating scheduling of interests in a content centric network, based on a token bucket size, in accordance with an embodiment of the present invention. During operation, the system receives, by a flow controller component associated with a transport stack and a local application, an initial interest which indicates an allocation of a number of tokens for a name prefix, wherein a respective token is used to forward a second interest with a name that includes the name prefix (operation 451). The system receives a first interest which indicates a command to set a window size for the transport stack based on the name prefix (operation 452). The system receives a second interest with a name that includes the name prefix indicated in the first interest (operation 454). The system determines whether a sufficient number of tokens exist to transmit the second interest (decision 456). If there is a sufficient number of tokens, the system transmits the second interest to a forwarder component associated with the transport stack (operation 458) and decreases the number of tokens for the name prefix (operation 460). If there is an insufficient number of tokens, the system refrains from transmitting the second interest to the forwarder component. The system can wait or block transmission of the second interest until a sufficient number of tokens is available. The system may also drop the second interest after a predetermined amount of time or a timeout of the second interest (not shown).

Exemplary Computer System

Figure 5:
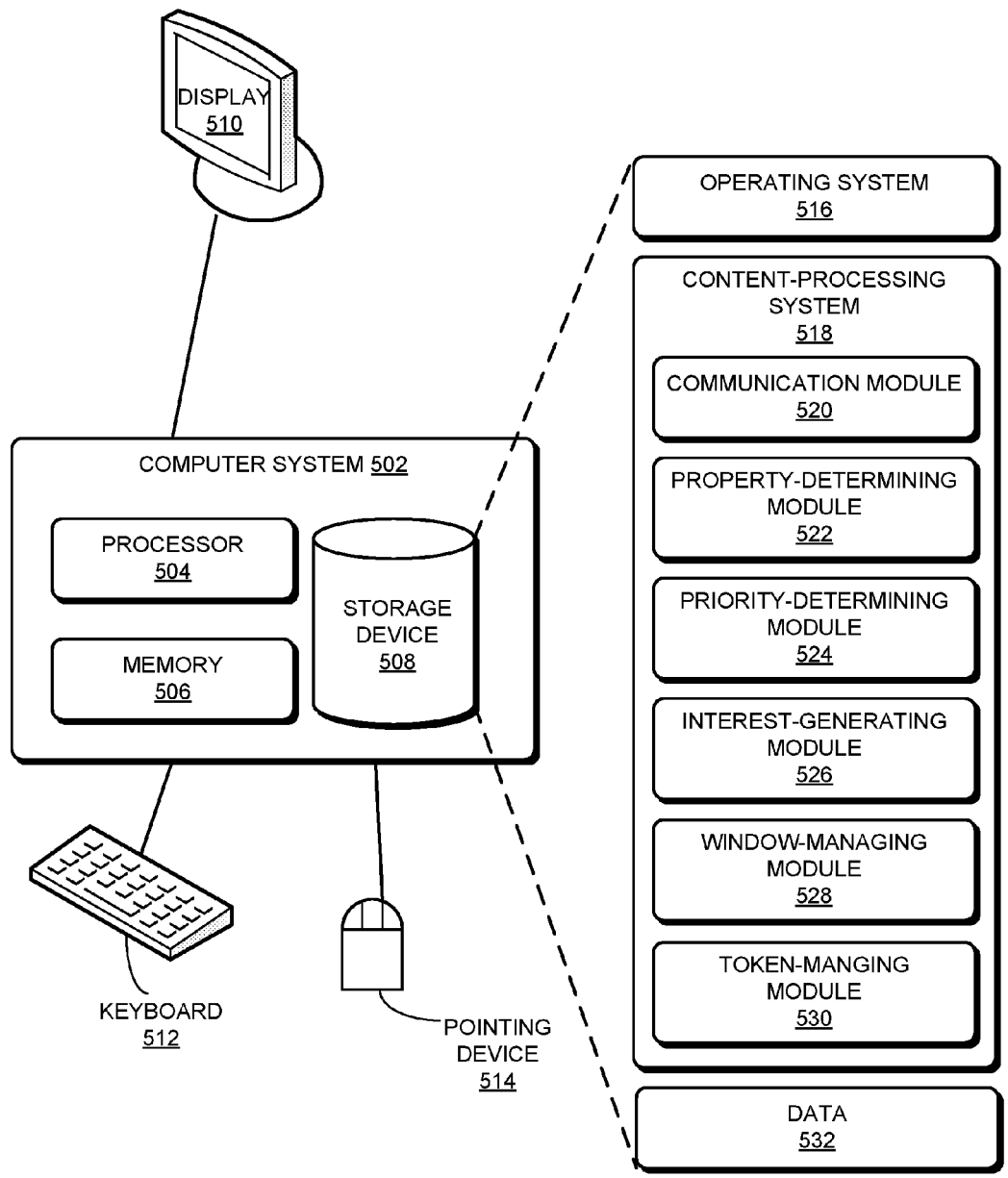
FIG. 5 illustrates an exemplary computer system that facilitates scheduling of interests in a content centric network, in accordance with an embodiment of the present invention.

FIG. 5 illustrates an exemplary computer system 502 that facilitates scheduling of interests in a CCN, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a content centric network, and for transmitting packets between an application, an IDF component, a CCN portal, a transport stack, and a forwarder residing on the same computing device (communication module 520). A data packet can include an interest packet or a content object packet with a name that is an HSVLI.

Furthermore, content-processing system 518 can include instructions for determining network properties associated with name prefixes of interests transmitted by a plurality of local applications (property-determining module 520). Content-processing system 518 can include instructions for generating a first interest which indicates a command to set a window size for a transport stack associated with a respective local application based on the network properties (interest-generating module 526). Content-processing system 518 can include instructions for transmitting the first interest to a component associated with the transport stack (communication module 520), which causes the component to set the window size for the transport stack (window-managing module 528).

Content-processing system 518 can also include instructions for determining a priority or a weight for the transport stack associated with the respective local application based on one or more of: the network properties; a characteristic of interests transmitted by the respective local application; and information indicated in the interests transmitted by the respective local application (priority-determining module 524). Content-processing system 518 can include instructions for assigning the priority or the weight to the transport stack associated with the respective local application (priority-determining module 524) and for indicating in the first interest a value for the window size, wherein the value is based on the priority or the weight (interest-generating module 526).

Content-processing system 518 can further include instructions for allocating a predetermined number of tokens to the transport stack based on a name prefix and the priority or the weight assigned to the transport stack (token-managing module 530). Content-processing system 518 can include instructions for receiving, from the respective local application by a flow controller component, a second interest with a name that includes the name prefix (communication module 520) and causing the flow controller component to, in response to determining a sufficient number of allocated tokens (token-managing module 530), transmit the second interest to a local forwarder component associated with the transport stack (communication module 520).

Additionally, content-processing system 518 can include instructions for receiving a first interest which indicates a command to set a window size for a transport stack based on a name prefix (communication module 520) and for receiving a second interest with a name that includes the name prefix indicated in the first interest (communication module 520). Content-processing system 518 can include instructions for, in response to determining that the window size for the transport stack is sufficient (window-managing module 528), transmitting the second interest to a forwarder component associated with the transport stack (communication module 520). Content-processing system 518 can include instructions for, in response to determining that the window size is not sufficient (window-managing module 528), refraining from transmitting the second interest (communication module 520).

Content-processing system 518 can also include instructions for receiving an initial interest which indicates an allocation of a number of tokens for a name prefix (communication module 520). Content-processing system 518 can include instructions for, in response to determining a sufficient number of tokens for the name prefix (token-managing module 530), transmitting the second interest to the forwarder component (communication module 520), and decreasing the number of tokens for the name prefix (token-managing module 530). Content-processing system 518 can include instructions for, in response to determining an insufficient number of tokens for the name prefix (token-managing module 530), refraining from transmitting the second interest (communication module 520).

Data 532 can include any data that is required as input or that is generated as output by the methods and/or processes described in this disclosure. Specifically, data 532 can store at least: a name; an interest; a content object; an interest name; a name that is an HSVLI; a name prefix; a window size; a value for the window size; a command; a command to set the window size; network properties (including as described in relation to FIG. 3); a local application; an IDF; an IDI; a scheduler component; a portal API; a transport framework; a transport stack; a stack component; a flow controller component; a forwarder; a priority or a weight for a transport stack; a characteristic of an interest; an indicator of whether a field of an interest or a name component is encrypted; information indicated in an interest; an indicator of whether the information indicated in an interest includes a request to categorize the interest; a requested priority or preference; a token; an allocated or a predetermined number of tokens; a name for an interest that indicates a device on which the local applications reside, the transport stack associated with the respective local application, the component associated with the transport stack (wherein the component sets the window size in response to receiving the first interest), and the command to set the window size for the transport stack to a value; and a command to set the window size to the value.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating scheduling of interests in a content centric network, the system comprising:
a processor; and
a storage device storing instructions that when executed by the processor cause the processor to perform a method, the method comprising:
determining network properties associated with name prefixes of interests transmitted by a plurality of local applications, wherein a name for an interest is a hierarchically structured variable length identifier that includes contiguous name components ordered from a most general level to a most specific level, and wherein a name prefix includes one or more contiguous name components;
generating a first interest which indicates a command to set a window size for a transport stack associated with a respective local application based on the network properties;
allocating a predetermined number of tokens to the transport stack based on a name prefix and a priority or a weight assigned to the transport stack; and
transmitting the first interest to a component associated with the transport stack, which causes the component to set the window size for the transport stack, thereby facilitating scheduling of interests based on the network properties.

2. The computer system of claim 1, wherein the network properties are further associated with content objects received by the local applications in response to the transmitted interests, and wherein the network properties are one or more of:
a round trip time that begins when an interest is transmitted and ends when a corresponding content object is received;
an estimate of the round trip time based on round trip times for transmitted interests and corresponding received content objects based on a predetermined amount of time;
a total number of the transmitted interests;
a number of the transmitted interests based on the predetermined amount of time;
a changing rate of the transmitted interests and the corresponding received content objects based on the predetermined amount of time;
a total number of interest return messages received, wherein an interest return message is received in response to an interest and is identified based on a code indicated in the message;
a number of the interest return messages received based on the predetermined amount of time;
a number of the transmitted interests for which a corresponding content object is not received based on the predetermined amount of time;
a number of the transmitted interests that time out based on the predetermined amount of time;
a number of the transmitted interests which are retransmitted based on the predetermined amount of time; and
a number of retransmitted interests that time out based on the predetermined amount of time.

3. The computer system of claim 1, wherein the component associated with the transport stack is a flow controller component that sets the window size for transmission of packets through the transport stack, and
wherein the flow controller component resides:
in the transport stack as a component of the transport stack; or
between the plurality of local applications and the transport stack.

4. The computer system of claim 1, wherein the method is performed by a scheduler component that resides between the plurality of local applications and a portal instance associated with the transport stack, and wherein the scheduler component, the plurality of local applications, the component associated with the transport stack, and the transport stack reside on a same computing device.

5. The computer system of claim 1, wherein generating the first interest further involves:
determining the priority or the weight assigned to the transport stack based on one or more of:
the network properties;
a characteristic of interests transmitted by the respective local application; and
information indicated in the interests transmitted by the respective local application.

6. The computer system of claim 5, wherein the characteristic includes whether one or more fields of the interests transmitted by the respective local application are encrypted or whether one or more name components of the names of the interests transmitted by the respective local application are encrypted, and wherein the information includes a request to categorize the interests transmitted by the respective local application at a specific priority.

7. The computer system of claim 5, wherein the method further comprises:
assigning the priority or the weight to the transport stack; and
indicating in the first interest a value for the window size, wherein the value is based on the priority or the weight.

8. The computer system of claim 7, wherein a second interest with a name that includes the name prefix is subsequently received from the respective local application by a flow controller component and causes the flow controller component to:
in response to determining a sufficient number of allocated tokens, transmit the second interest to a local forwarder component associated with the transport stack.

9. The computer system of claim 1, wherein a name for the first interest indicates one or more of the following:
a device on which the plurality of local applications reside;
the transport stack;
the component associated with the transport stack, wherein the component sets the window size in response to receiving the first interest; and
the command to set the window size for the transport stack to a value.

10. A computer-implemented method for facilitating scheduling of interests in a content centric network, the method comprising:
determining, by a scheduler component, network properties associated with name prefixes of interests transmitted by a plurality of local applications, wherein a name for an interest is a hierarchically structured variable length identifier that includes contiguous name components ordered from a most general level to a most specific level, and wherein a name prefix includes one or more contiguous name components;
generating a first interest which indicates a command to set a window size for a transport stack associated with a respective local application based on the network properties;
allocating a predetermined number of tokens to the transport stack based on a name prefix and a priority or a weight assigned to the transport stack; and
transmitting the first interest to a component associated with the transport stack, which causes the component to set the window size for the transport stack, thereby facilitating scheduling of interests based on the network properties.

11. The method of claim 10, wherein the network properties are further associated with content objects received by the local applications in response to the transmitted interests, and wherein the network properties are one or more of:
a round trip time that begins when an interest is transmitted and ends when a corresponding content object is received;
an estimate of the round trip time based on round trip times for transmitted interests and corresponding received content objects based on a predetermined amount of time;
a total number of the transmitted interests;
a number of the transmitted interests based on the predetermined amount of time;
a changing rate of the transmitted interests and the corresponding received content objects based on the predetermined amount of time;
a total number of interest return messages received, wherein an interest return message is received in response to an interest and is identified based on a code indicated in the message;
a number of the interest return messages received based on the predetermined amount of time;
a number of the transmitted interests for which a corresponding content object is not received based on the predetermined amount of time;
a number of the transmitted interests that time out based on the predetermined amount of time;
a number of the transmitted interests which are retransmitted based on the predetermined amount of time; and
a number of retransmitted interests that time out based on the predetermined amount of time.

12. The method of claim 10, wherein the component associated with the transport stack is a flow controller component that sets the window size for transmission of packets through the transport stack, and
wherein the flow controller component resides:
in the transport stack as a component of the transport stack; or
between the plurality of local applications and the transport stack.

13. The method of claim 10, wherein the scheduler component resides between the plurality of local applications and a portal instance associated with the transport stack, and wherein the scheduler component, the plurality of local applications, the component associated with the transport stack, and the transport stack reside on a same computing device.

14. The method of claim 10, wherein generating the first interest further involves:
determining the priority or the weight assigned to the transport stack based on one or more of:
the network properties;
a characteristic of interests transmitted by the respective local application; and
information indicated in the interests transmitted by the respective local application;
assigning the priority or the weight to the transport stack; and
indicating in the first interest a value for the window size, wherein the value is based on the priority or the weight.

15. The method of claim 14, wherein the characteristic includes whether one or more fields of the interests transmitted by the respective local application are encrypted or whether one or more name components of the names of the interests transmitted by the respective local application are encrypted, and
wherein the information includes a request to categorize the interest interests transmitted by the respective local application at a specific priority.

16. The method of claim 14, wherein a second interest with a name that includes the name prefix is subsequently received from the respective local application by a flow controller component and causes the flow controller component to:
in response to determining a sufficient number of allocated tokens, transmit the second interest to a local forwarder component associated with the transport stack.

17. The method of claim 10, wherein a name for the first interest indicates one or more of the following:

a device on which the plurality of local applications reside;

the transport stack;

the component associated with the transport stack, wherein the component sets the window size in response to receiving the first interest; and the command to set the window size for the transport stack to a value.

18. A computer system for facilitating fair scheduling of interests in a content centric network, the system comprising:

a processor; and a storage device storing instructions that when executed by the processor cause the processor to perform a method, the method comprising:

receiving an initial interest which indicates an allocation of a predetermined number of tokens based on a name prefix and a priority or a weight assigned to a transport stack;

receiving a first interest which indicates a command to set a window size for the transport stack based on the name prefix, wherein a name for an interest is a hierarchically structured variable length identifier that includes contiguous name components ordered from a most general level to a most specific level, and wherein a name prefix includes one or more contiguous name components;

receiving a second interest with a name that includes the name prefix indicated in the first interest;

in response to determining that the window size for the transport stack is sufficient, transmitting the second interest to a forwarder component associated with the transport stack; and in response to determining that the window size is not sufficient, refraining from transmitting the second interest, thereby facilitating scheduling of interests.

19. The computer system of claim 18, wherein a respective token is used to forward the second interest with the name that includes the name prefix, wherein:

transmitting the second interest to the forwarder component includes transmitting the second interest to the forwarder component in response to determining a sufficient number of tokens for the name prefix refraining from transmitting the second interest includes refraining from transmitting the second interest in response to determining an insufficient number of tokens for the name prefix, the method further comprising:

decreasing the number of tokens for the name prefix in response to determining the sufficient number of tokens.

20. The computer system of claim 18, wherein the method is performed by a flow controller component that is associated with the transport stack and a local application, and wherein the flow controller component, the transport stack, and the local application reside on a same computing device.

* * * * *